(12) United States Patent
Etou

(10) Patent No.: US 10,860,003 B2
(45) Date of Patent: Dec. 8, 2020

(54) SERVO CONTROLLER

(71) Applicant: Fanuc Corporation, Yamanashi (JP)

(72) Inventor: Kouichi Etou, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/582,488

(22) Filed: Sep. 25, 2019

(65) Prior Publication Data

US 2020/0103853 A1 Apr. 2, 2020

(30) Foreign Application Priority Data

Sep. 27, 2018 (JP) .................... 2018-182766

(51) Int. Cl.
*G05B 19/414* (2006.01)
*G05B 19/33* (2006.01)
*H02P 9/18* (2006.01)
*G05B 19/408* (2006.01)

(52) U.S. Cl.
CPC ......... *G05B 19/4141* (2013.01); *G05B 19/33* (2013.01); *G05B 19/4086* (2013.01)

(58) Field of Classification Search
CPC ........ G05B 19/4141; G05B 19/33; H02P 9/18
See application file for complete search history.

(56) References Cited

U.S. PATENT DOCUMENTS 9,555,549 B2 * 1/2017 Motoyoshi ............ B25J 9/1687

FOREIGN PATENT DOCUMENTS

JP 2006350768 A 12/2006
JP 2008-176673 A 7/2008

* cited by examiner

*Primary Examiner* — Cortez M Cook
(74) *Attorney, Agent, or Firm* — RatnerPrestia

(57) ABSTRACT

The servo controller is provided with a command reception unit and a servo control computation unit. In a measurement mode, the command reception unit asynchronously receives with every command reception period a counter output by the control device with every command update period. The servo controller is further provided with an event detection unit configured to detect the occurrence of an event which entails variation in reception intervals of the counter in the measurement mode, a deviation calculation unit configured to calculate a deviation amount between respective clocks of the control device and the servo controller, based on an occurrence period of the event and the command reception period, in the measurement mode, and a reception period adjustment unit configured to adjust the command reception period based on the deviation amount in an operation mode.

4 Claims, 11 Drawing Sheets

FIG.7

| CYCLE (n) | DEVIATION AMOUNT Dn [TIME] $D_n = t + R_{n-1}$ | ADJUSTMENT AMOUNT Qn [CLOCK UNIT] QUOTIENT OF Qn = Dn/T (INTEGER PART) = QUOTIENT OF $(t + R_{n-1})/T$ (INTEGER PART) | CARRY-OVER TIME Rn [TIME] $R_n = D_n - (Q_n \times T)$ |
|---|---|---|---|
| 1 | 12.5 (=t) | 0 | 12.5(=t) |
| 2 | 25 | 1 ★ | 5 |
| 3 | 17.5 | 0 | 17.5 |
| 4 | 30 | 1 ★ | 10 |
| 5 | 22.5 | 1 ★ | 2.5 |
| 6 | 15 | 0 | 15 |
| 7 | 27.5 | 1 ★ | 7.5 |
| 8 | 20 | 1 ★ | 0 |
| 9 | 12.5 | 0 | 12.5 |
| 10 | 25 | 1 ★ | 5 |
| 11 | 17.5 | 0 | 17.5 |
| 12 | 30 | 1 ★ | 10 |
| 13 | 22.5 | 1 ★ | 2.5 |
| 14 | 15 | 0 | 15 |
| 15 | 27.5 | 1 ★ | 7.5 |
| 16 | 20 | 1 ★ | 0 |

FIG.9

| CYCLE (n) | DEVIATION AMOUNT Dn [TIME] Dn = t + Rn−1 | ADJUSTMENT AMOUNT Qn [CLOCK UNIT] QUOTIENT OF Qn = Dn/T (INTEGER PART) = QUOTIENT OF (t + Rn−1)/T (INTEGER PART) | NEXT CARRY-OVER Rn [TIME] Rn = Dn − (Qn × T) |
|---|---|---|---|
| 1 | −12.5 (=t) | 0 | −12.5 (=t) |
| 2 | −25 | −1 ★ | −5 |
| 3 | −17.5 | 0 | −17.5 |
| 4 | −30 | −1 ★ | −10 |
| 5 | −22.5 | −1 ★ | −2.5 |
| 6 | −15 | 0 | −15 |
| 7 | −27.5 | −1 ★ | −7.5 |
| 8 | −20 | −1 ★ | 0 |
| 9 | −12.5 | 0 | −12.5 |
| 10 | −25 | −1 ★ | −5 |
| 11 | −17.5 | 0 | −17.5 |
| 12 | −30 | −1 ★ | −10 |
| 13 | −22.5 | −1 ★ | −2.5 |
| 14 | −15 | 0 | −15 |
| 15 | −27.5 | −1 ★ | −7.5 |
| 16 | −20 | −1 ★ | 0 |

SERVO CONTROLLER

RELATED APPLICATIONS

The present application claims priority to Japanese Patent Application Number 2018-182766 filed Sep. 27, 2018, the disclosure of which is hereby incorporated by reference herein in its entirety.

BACKGROUND OF THE INVENTION

Field of the Invention

The present invention relates to a servo controller, and more particularly, to a servo controller in which variation in command reception intervals can be improved.

Description of the Related Art

There are known motion systems for asynchronous communication between a control device as a motion controller (e.g., numerical controller) and a servo controller (e.g., servo drive), as shown in FIG. 1 (see Japanese Patent Applications Laid-Open Nos. 2006-350768 and 2008-176673). In these motion systems, the control device outputs a command in a fixed period and a command reception unit of the servo controller receives the command in the fixed period. A servo control computation unit drives a motor in response to the received command. A pulse coder feeds back a position or speed to the servo control computation unit.

In the motion systems of this type, even though the control device performs command update (or command output) in the fixed period, the servo controller may sometimes fail to receive the command in the fixed period. Specifically, a phenomenon that the command reception timing is shifted by a margin equal to one operating cycle of the servo controller occurs periodically.

FIG. 2 shows a specific example. The control device periodically updates the command according to a command update period M. The servo controller periodically attempts command reception according to a command reception period S. If the command update period M is given by M=S (command reception period)×3, for example, the servo controller should theoretically be able to receive the command with every three command reception periods without exception. Actually, however, a phenomenon that the command is received with four command reception periods, not three, occurs at every fixed time, as shown in FIG. 2.

The main cause of occurrence of such a phenomenon may be that the control device and the servo controller have their own independent clocks. Although it is ideal that the respective clocks of the two devices completely match each other in reference time and clock intervals, they are actually subject to small deviations. If these deviations are accumulated and if the accumulated deviations exceed the command reception period S, the above phenomenon occurs inevitably.

The control device and the servo controller perform control based on the assumption that the command is updated and received in the fixed period. If the command reception in the servo controller is not performed in the fixed period, therefore, the motor speed or position commanded by the control device disagrees with the speed or position of the motor driven by the servo controller, so that the positioning accuracy is inevitably reduced. Moreover, the response time from the command update until the servo controller receives the command and drives the motor is undesirably delayed.

FIG. 3 shows the result of comparison between a motor speed (full line) based on a movement command output by the control device and a motor speed (broken line) based on the command received by the servo controller at a certain timing. If the command reception in the servo controller is performed in a completely fixed period, that is, if the command update period M is strictly an integer multiple of the command reception period S, the two speeds should originally be consistent. If the command reception in the servo controller suffers a one-period deviation, a difference equivalent to (1×command reception period S) is inevitably generated between the motor speed (full line) based on the movement command output by the control device and the motor speed (broken line) based on the command received by the servo controller, as indicated by encircling. Although the speed command is given by way of example in FIG. 3, the same problem can also be caused with the position command.

The present invention has been made to solve these problems and has an object to provide a servo controller in which variation in command reception intervals can be improved.

SUMMARY OF THE INVENTION

A servo controller according to one embodiment of the present invention is a servo controller comprising a command reception unit configured to asynchronously receive with every command reception period a command output by a control device with every command update period and a servo control computation unit configured to control a motor in response to the command. In a measurement mode, the command reception unit asynchronously receives with every command reception period a counter output by the control device with every command update period. The servo controller comprises an event detection unit configured to detect the occurrence of an event which entails variation in reception intervals of the counter in the measurement mode, a deviation calculation unit configured to calculate a deviation amount between respective clocks of the control device and the servo controller, based on an occurrence period of the event and the command reception period, in the measurement mode, and a reception period adjustment unit configured to adjust the command reception period based on the deviation amount in an operation mode.

In the servo controller according to the one embodiment of the present invention, adjustment time of the command reception period by the reception period adjustment unit is an integer multiple of a minimum clock value of the servo controller.

In the servo controller according to the one embodiment of the present invention, the phase of the command reception period after the adjustment thereof by the reception period adjustment unit is shifted by a substantially half-period length from that before the adjustment.

The servo controller according to the one embodiment of the present invention further comprises a deviation buffer unit configured to store the deviation amount.

According to the embodiments of the present invention, there can be provided a servo controller in which variation in command reception intervals can be improved.

BRIEF DESCRIPTION OF THE DRAWINGS

The above and other objects and features of the present disclosure will be obvious from the description of embodiments with reference to the accompanying drawings, in which:

FIG. 7 is a diagram showing the operation of the motion system comprising the servo controller of Example 1;

FIG. 9 is diagram showing the operation of the motion system comprising the servo controller of Example 2;

DETAILED DESCRIPTION OF THE PREFERRED EMBODIMENTS

The following is a description of the operation of a servo controller 100 according to embodiments of the present invention. The servo controller 100 comprises a mechanism for detecting and correcting variation in command reception intervals variation. The servo controller 100 has two modes of operation, a measurement mode and an operation mode.

The measurement mode is a mode for calculating the deviation amount between the respective clocks of a control device 200 and the servo controller 100 before an operation based on an actual command. The servo controller 100 is assumed to be previously stored with the following relationship between the respective command update periods of these two devices.

Command update period M=Command reception period S×a (a=1, 2, 3 . . . ).

Figure 1:
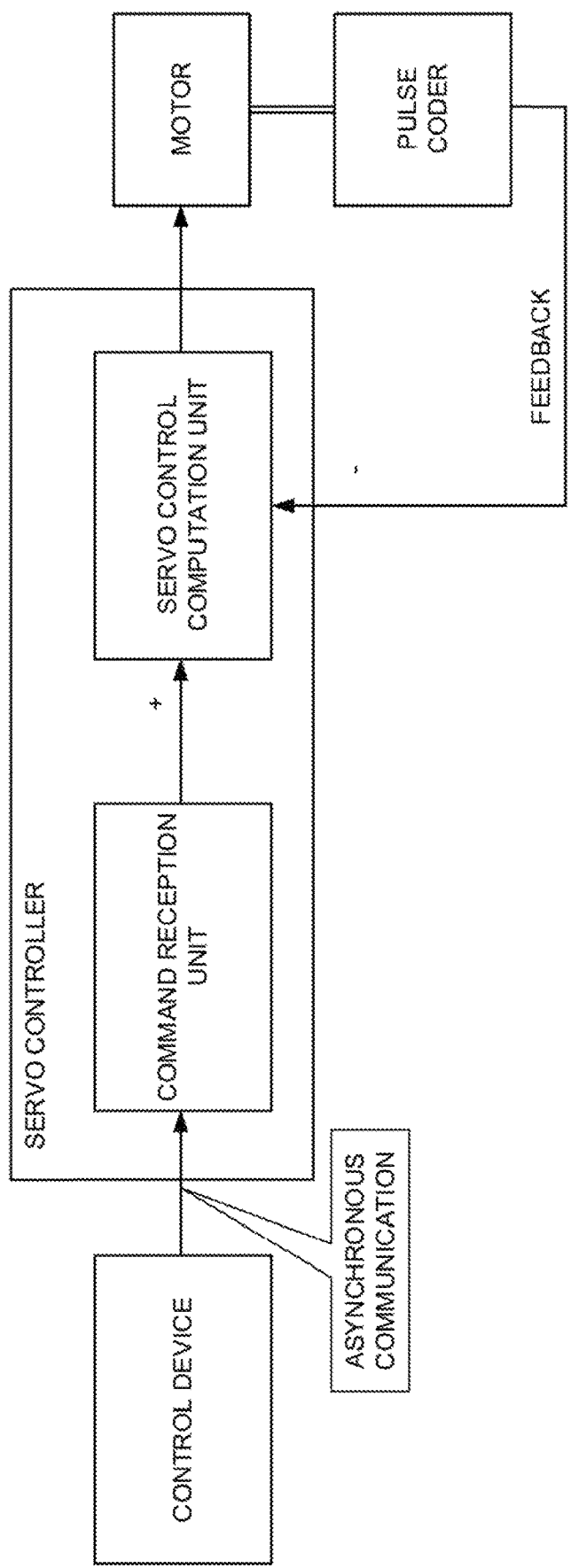
FIG. 1 is a diagram illustrating the structure of a motion system comprising a servo controller.
Figure 2:
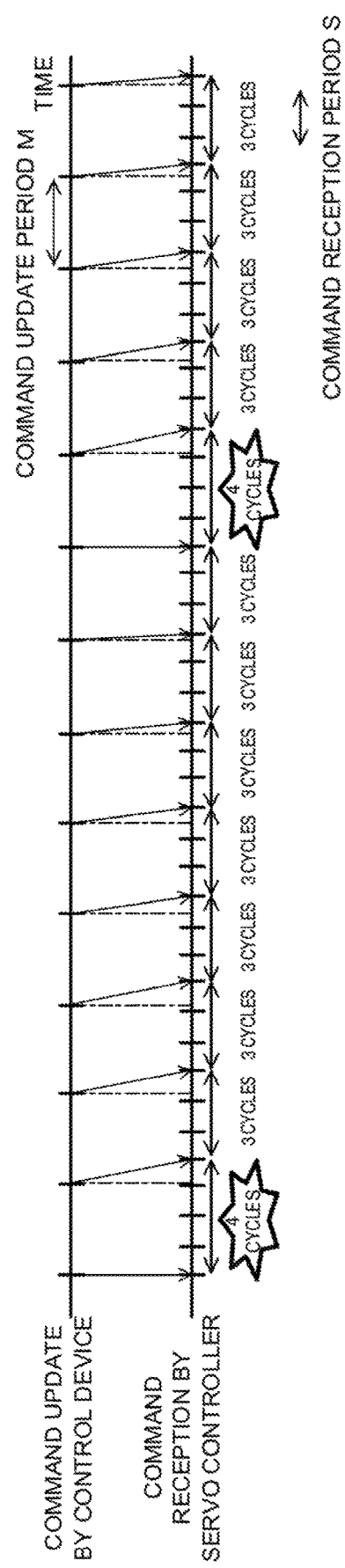
FIG. 2 is a diagram showing the operation of a motion system comprising a conventional servo controller.
Figure 3:
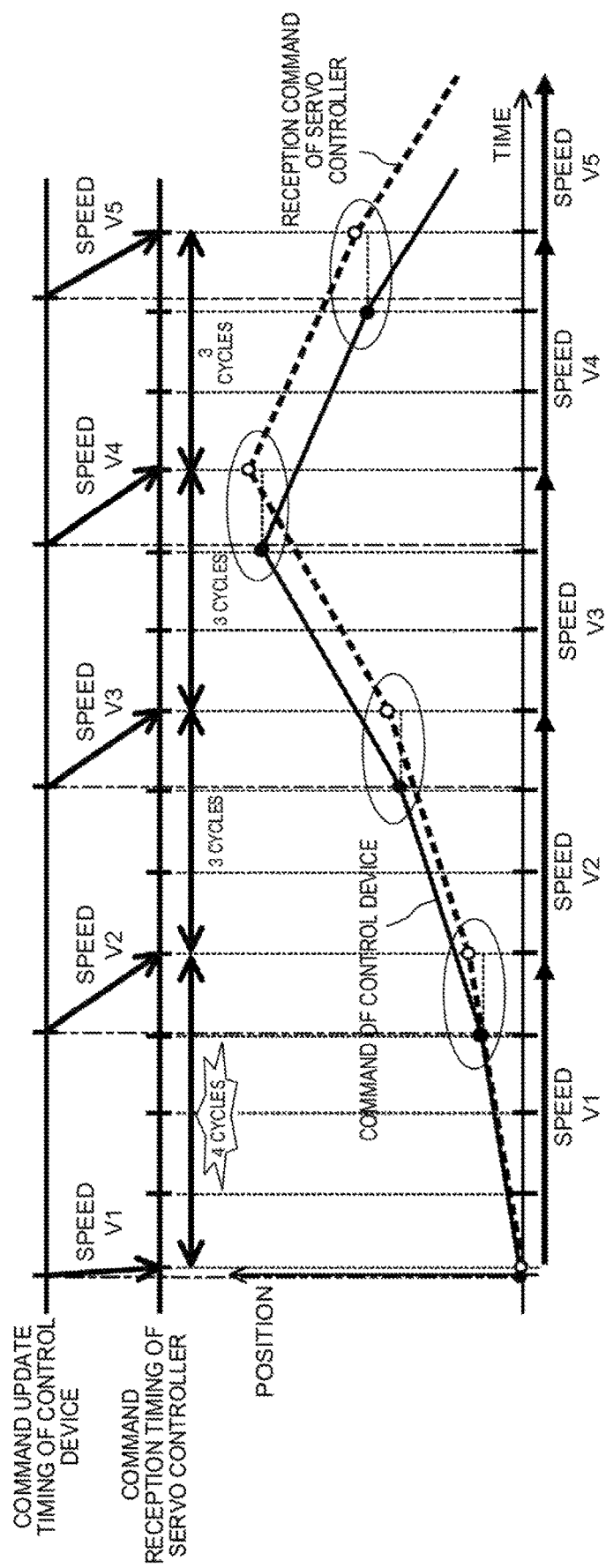
FIG. 3 is a diagram showing the operation of the motion system comprising the conventional servo controller.
Figure 4:
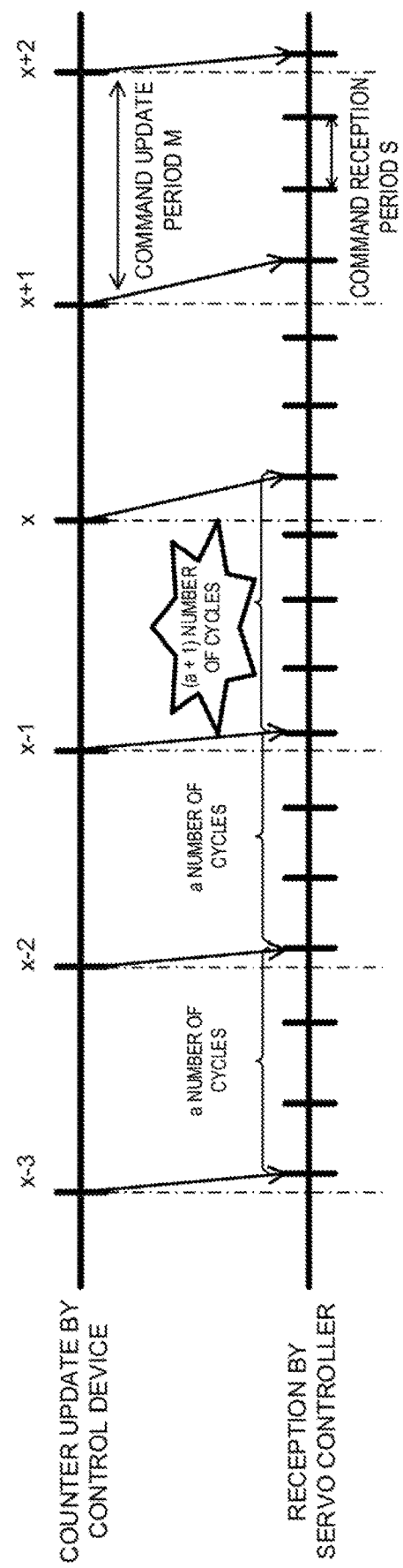
FIG. 4 is a diagram showing a method in which the servo controller calculates deviation amounts.
Figure 5:
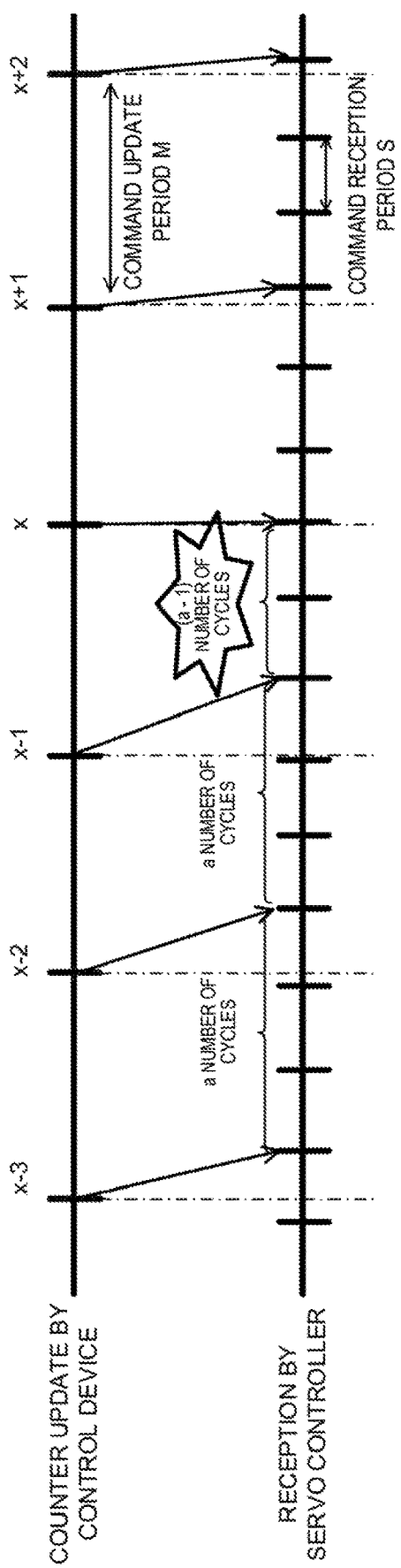
FIG. 5 is a diagram showing a method in which the servo controller calculates deviation amounts.

A method for calculating the deviation amount between the respective clocks of the two devices will be described with reference to FIGS. 4 and 5. The control device 200 periodically outputs a signal called a counter in place of the command. The period of counter output is the command update period M. The servo controller 100 periodically attempts the reception of the counter. The period of reception attempt is the command reception period S. In most cases, the servo controller 100 receives the counter with every a number of reception attempts. As the clock deviation accumulates, however, such a phenomenon (hereinafter referred to as "event") occurs that the counter cannot be received with every a number of reception attempts. Specifically, the servo controller 100 at the time of the occurrence of the event receives the counter upon an (a+1)th (see FIG. 4) or (a−1)th (see FIG. 5) reception attempt since the last reception. The occurrence of the event has a periodicity and its period is repeated with every x number of counter updates. The servo controller 100 measures this period x. A deviation amount t is calculated from the event occurrence period x and the command reception period S according to the following equations. The deviation amount t represents the progress of time for each command reception period S indicated by the clock of the servo controller 100 relative to a time indicated by the clock of the control device 200. It is indicated that the clock of the servo controller 100 is faster if the deviation amount t is positive and is slower if the deviation amount t is negative.

In the case where the servo controller 100 receives the counter when (a+1) number of reception attempts are performed with every x number of counter updates (see FIG. 4), the deviation amount t can be represented by the following equation:

$$t=S/(x \times a)(\text{reception interval}>a).$$

In the case where the servo controller 100 receives the counter when (a−1) number of reception attempts are performed with every x number of counter updates (see FIG. 5), the deviation amount t can be represented by the following equation:

$$t=-S/(x \times a)(\text{reception interval}<a).$$

The operation mode is a mode in which the operation is performed based on the actual command output by the control device 200. Based on the clock deviation amount calculated in the measurement mode, the servo controller 100 adjusts the command reception period S so that the event ceases to occur with every command reception. Specifically, the servo controller 100 changes the length of the command reception period S.

Deviation amounts $D_n$ at the time of an nth command reception in the servo controller 100 can be represented by the following equation:

$$D_n = t + R_{n-1},$$

where t is a deviation amount for each command reception period S and $R_{n-1}$ represents deviation amounts (hereinafter referred to as "carry-over times") having failed to be adjusted at the time of the last or (n−1)th command reception.

Of the amounts $D_n$, a deviation amount (hereinafter referred to as "adjustment time") that can be adjusted at the time of the nth command reception depends on a minimum clock value T. The minimum clock value T is a clock period that defines the timing of every processing of the servo controller 100 and is a minimum time unit for the adjustment of the length of the command reception period S. Thus, the adjustment time is an integer multiple of the minimum clock value T, which can be represented as follows:

$$\text{Adjustment time}=Q_n \times T,$$

where $Q_n$ is an integer part of the quotient of $D_n/T$.

The servo controller 100 adds the calculated adjustment time to the command reception period S. Thereupon, the length of the command reception period S is adjusted. The deviation amounts having failed to be adjusted at the time of the nth command reception are handled as the carry-over times at the time of the next or (n+1)th command reception. Carry-over times $R_n$ for the (n+1)th command reception can be represented as follows:

$$R_n = D_n - (Q_n \times T).$$

According to these steps of processing, the reception period is adjusted in units of minimum clock value T in each command reception. Thus, the accumulation of the deviation amount t between the respective clocks of the control device 200 and the servo controller 100 is eliminated as required, so that the occurrence of the event is suppressed.

Since the deviation amount t never changes even when a motion system 1 comprising the servo controller 100 is restarted, recalculation is unnecessary. The timing of processing start changes, however. After the restart, therefore, the timing of the occurrence of the next event should be once predicted in the measurement mode, which is to be switched over to the operation mode for the adjustment of the command reception period S.

Figure 10:
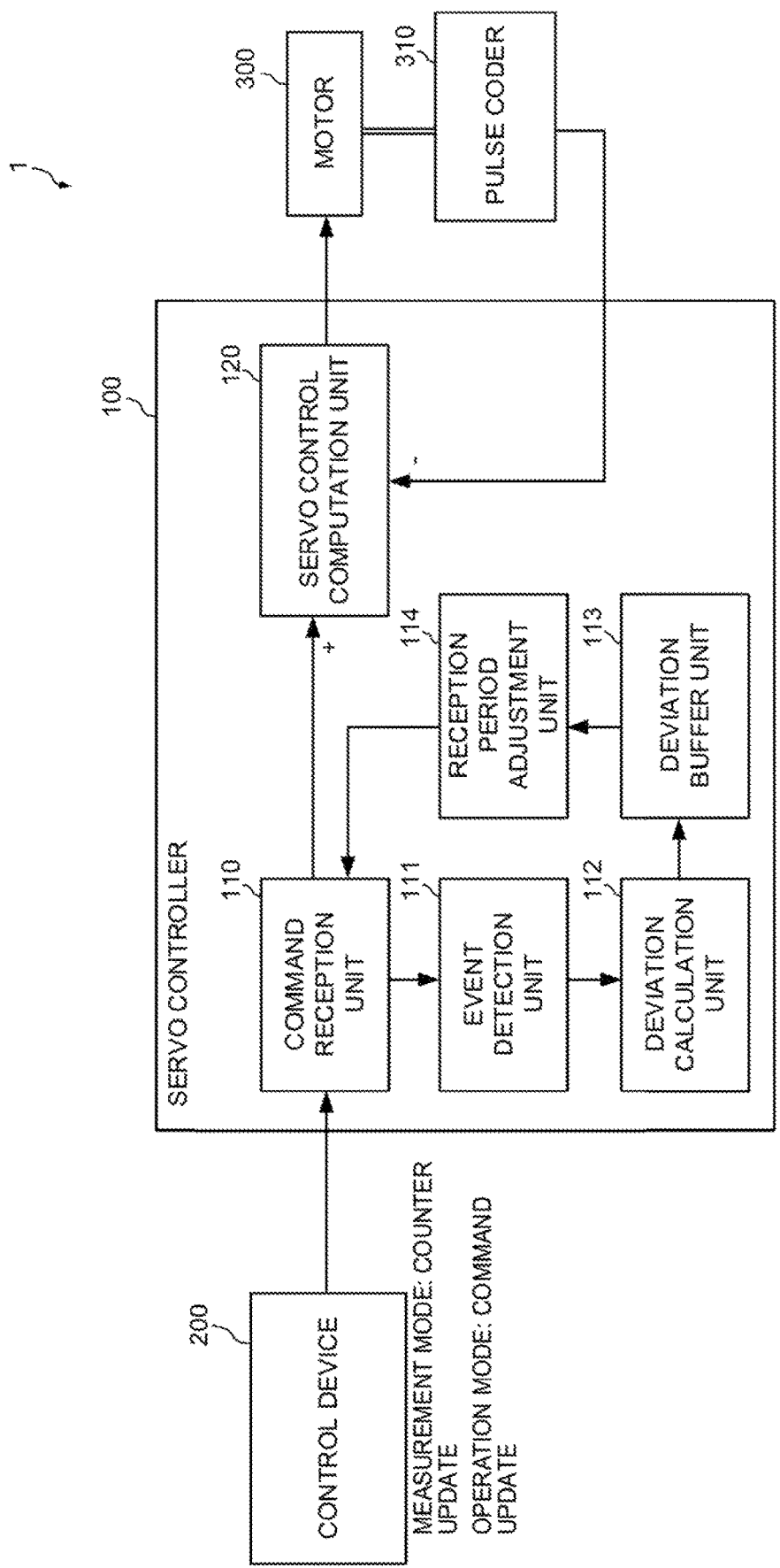
FIG. 10 is a diagram showing the structure of a motion system comprising a servo controller.

FIG. 10 is a block diagram showing the structure of a motion system 1 comprising a servo controller 100 according to an embodiment of the present invention. The motion system 1 comprises the servo controller 100, a control device 200, a motor 300, and a pulse coder 310.

The control device 200 is a host controller such as a numerical controller or PLC (programmable logic controller). The control device 200 outputs to the servo controller 100 a counter in the measurement mode and position and speed commands in the operation mode.

The servo controller 100 comprises a command reception unit 110, event detection unit 111, deviation calculation unit 112, deviation buffer unit 113, reception period adjustment unit 114, and servo control computation unit 120.

The command reception unit 110 receives the counter or the commands such as the position and speed commands output by the control device 200.

In the measurement mode, the event detection unit 111 detects the occurrence of the event in the servo controller 100.

In the measurement mode, the deviation calculation unit 112 calculates the relative deviation amount t between the respective internal clocks of the control device 200 and the servo controller 100 based on the event occurrence period x (for which the event occurs with every x number of counter updates) and the command reception period S.

The deviation buffer unit 113 temporarily saves the deviation amount t calculated by the deviation calculation unit 112 in the measurement mode.

In the operation mode, the reception period adjustment unit 114 adjusts the command reception period S based on the deviation amount t saved by the deviation buffer unit 113, thereby suppressing the occurrence of the event.

The servo control computation unit 120 outputs a command pulse signal responsive to a command to the motor 300. The motor 300 is driven at a rotation angle and a rotation speed corresponding to the command pulse signal. The pulse coder 310 detects the rotation angle and the rotation speed of the axis of the motor 300 and feeds them back as encoder signals to the servo control computation unit 120. The servo control computation unit 120 performs feedback control based on the encoder signals, thereby adjusting the command pulse signal.

A specific operation example of the servo controller 100 will be disclosed as an example.

Example 1

Figure 6:
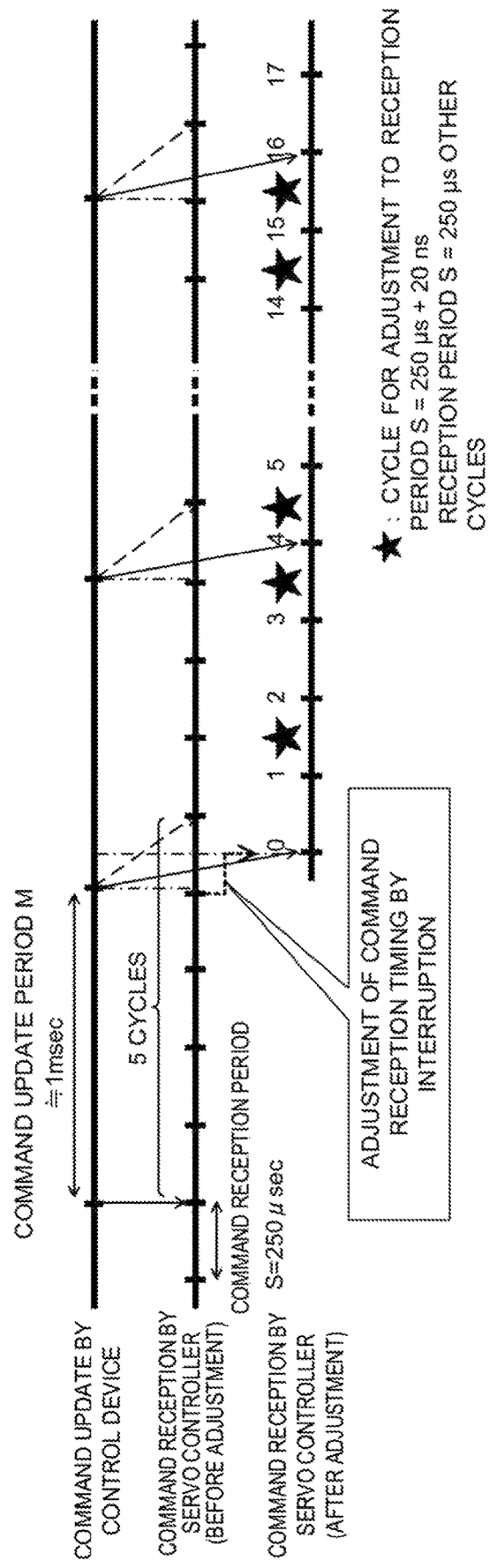
FIG. 6 is a diagram showing the operation of a motion system comprising a servo controller of Example 1.

The operation of a motion system 1 comprising a servo controller 100 according to Example 1 will be described with reference to FIGS. 6 and 7. In the measurement mode, as shown in FIG. 6, a control device 200 output counters in the command update period M≈1 ms. Before the adjustment or in the measurement mode, the servo controller 100 attempted the counter reception with the command reception period S=250 μs. Consequently, events with long command reception intervals periodically occurred entailing x=5,000 and a=4. Thus, a command reception unit 110 received the counter with every four reception attempts in most cases but with five reception attempts in seldom cases (event occurrence). An event occurred with every 5,000 command updates. Consequently, a deviation calculation unit 112 calculated the deviation amount t for each command reception period S as 12.5.

In the operation mode, a reception period adjustment unit 114 of the servo controller 100 calculated the deviation amount $D_n$, adjustment amount $Q_n$, and carry-over time $R_n$ with every command reception. FIG. 7 shows transitions of the calculated deviation amount $D_n$, adjustment amount $Q_n$, and carry-over time $R_n$. In command reception cycles (indicated by asterisks) with the adjustment amount $Q_n$ of 1, the command reception period S was adjusted in units of minimum clock value T=20 ns so that the accumulation of the deviation amount was partially eliminated. Thus, it can be understood that the deviation amount $D_n$ was reduced in the next command reception cycle.

As shown in FIG. 6, the servo controller 100 after the adjustment or in the operation mode adjusted the command reception period S to 250 μs+20 ns in the command reception cycles indicated by the asterisks. Since no adjustment is made in the unmarked command reception cycles, the command reception period S remains at 250 μs. The accumulation of the clock deviation amount t was eliminated as required by this adjustment. Thus, no event occurred in the operation mode.

Preferably, as shown in FIG. 6, the servo controller 100 should shift the phase of the command reception period after the adjustment by about a/2 from that before the adjustment by interruption when the measurement mode transfers to the operation mode, that is, when the adjustment is started. In this way, the command reception can be started at a timing when an event is least liable to occur. Moreover, this interruption should preferably be performed at a timing one cycle or more before a command reception cycle in which the event is expected to occur. Thus, a processing time can be secured for the adjustment of the command reception period S, so that the mode can be smoothly shifted to the operation mode.

Example 2

Figure 8:
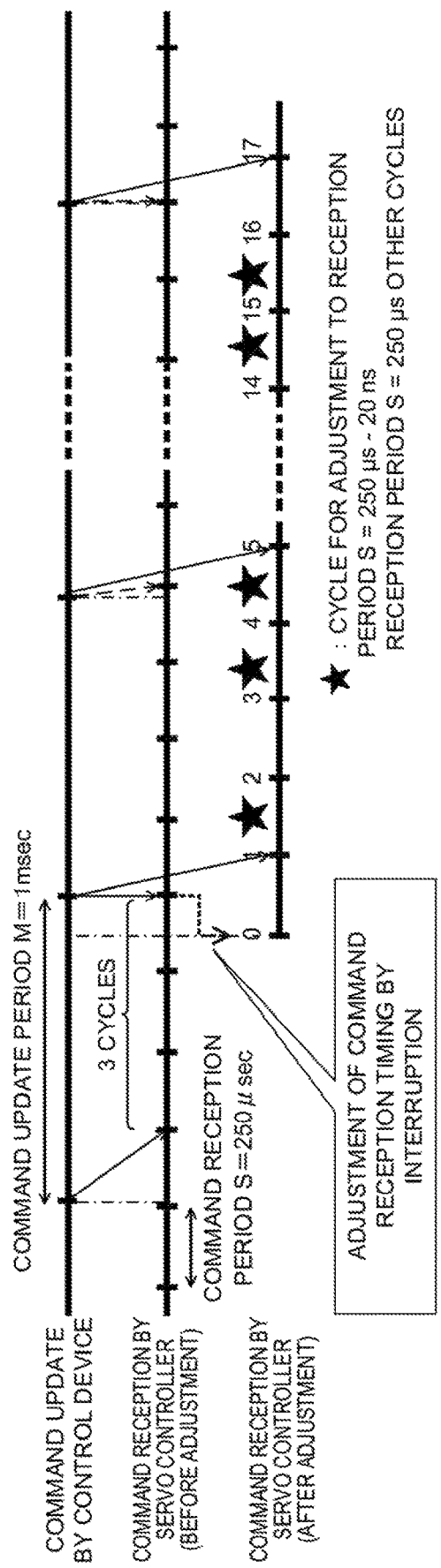
FIG. 8 is a diagram showing the operation of a motion system comprising a servo controller of Example 2.

The operation of a motion system 1 comprising a servo controller 100 according to Example 2 will be described with reference to FIGS. 8 and 9. In the measurement mode, as shown in FIG. 8, a control device 200 output counters in the command update period M≈1 ms. Before the adjustment or in the measurement mode, the servo controller 100 attempted the counter reception with the command reception period S=250 μs. Consequently, events with short command reception intervals periodically occurred entailing x=5,000 and a=4. Thus, a command reception unit 110 received the counter with every four reception attempts in most cases but with three reception attempts in seldom cases (event occurrence). An event occurred with every 5,000 command updates. Consequently, a deviation calculation unit 112 calculated the deviation amount t for each command reception period S as 12.5.

In the operation mode, a reception period adjustment unit 114 of the servo controller 100 calculated the deviation amount $D_n$, adjustment amount $Q_n$, and carry-over time $R_n$ with every command reception. FIG. 9 shows transitions of the calculated deviation amount $D_n$, adjustment amount $Q_n$, and carry-over time $R_n$. In command reception cycles (indicated by asterisks) with the adjustment amount $Q_n$ of −1, the command reception period S was adjusted in units of minimum clock value T=20 ns so that the accumulation of the deviation amount was partially eliminated. Thus, it can be understood that the absolute value of the deviation amount $D_n$ was reduced in the next command reception cycle.

As shown in FIG. 8, the servo controller 100 after the adjustment or in the operation mode adjusted the command reception period S to 250 µs-20 ns in the command reception cycles indicated by the asterisks. Since no adjustment is made in the unmarked command reception cycles, the command reception period S remains at 250 µs. The accumulation of the clock deviation amount t was eliminated as required by this adjustment. Thus, no event occurred in the operation mode.

Preferably, also in Example 2 as shown in FIG. 8, the servo controller 100 should shift the phase of the command reception period after the adjustment by about a/2 from that before the adjustment by interruption when the measurement mode transfers to the operation mode, that is, when the adjustment is started. In this way, the command reception can be started at a timing when an event is least liable to occur. Moreover, this interruption should preferably be performed at a timing one cycle or more before a command reception cycle in which the event is expected to occur. Thus, a processing time can be secured for the adjustment of the command reception period S, so that the mode can be smoothly shifted to the operation mode.

According to the present embodiment, even in the case where the command update by the control device 200 and the command reception by the servo controller 100 are asynchronous, the servo controller 100 calculates the deviation amount between the respective clocks of these two devices and adjusts the command reception period based on the deviation amount. Thus, the servo controller 100 can suppress the variation in the command reception intervals. Consequently, disagreement between the command output by the control device 200 and the actual command to be output by the servo controller 100 can be reduced, so that the responsiveness is improved. Moreover, the positioning accuracy is improved. Furthermore, the machining accuracy is improved to reduce the defect rate, so that the productivity is enhanced. In addition, a test facility can be operated with stability.

Figure 11:
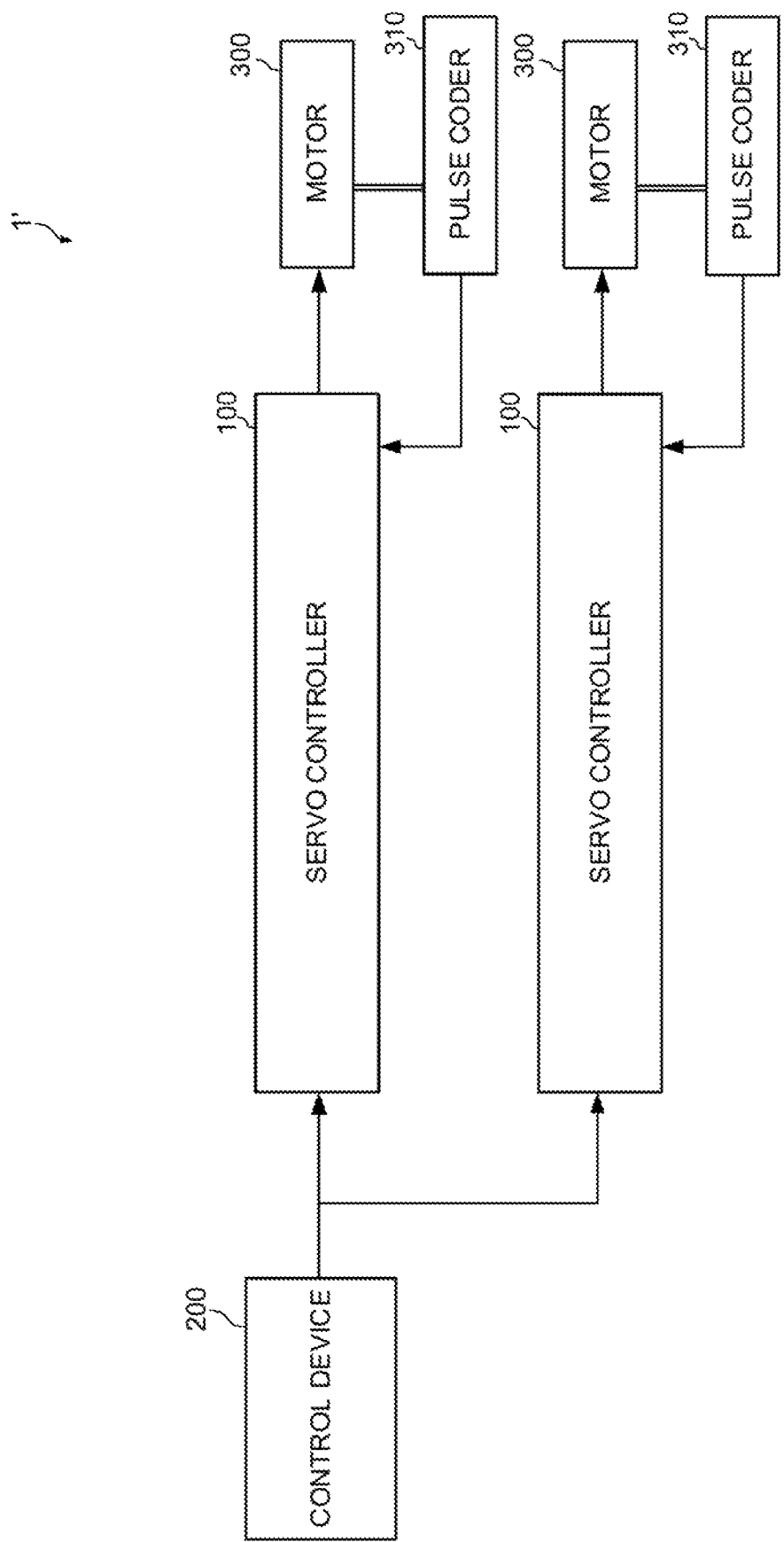
FIG. 11 is a diagram showing another example of the structure of the motion system comprising the servo controller.

The present invention is not limited to the embodiment described above and various changes may be made without departing from the spirit of the invention. As shown in FIG. 11, for example, a plurality of servo controllers 100 may be connected to the control device 200. In this case, the processing described in connection with the above embodiment is carried out between the control device 200 and the individual servo controllers 100.

The invention claimed is:

1. A servo controller comprising a command reception unit configured to asynchronously receive with every command reception period a command output by a control device with every command update period and a servo control computation unit configured to control a motor in response to the command, wherein the command reception unit asynchronously receives with every said command reception period a counter output by the control device with every said command update period in a measurement mode, the servo controller comprising:

an event detection unit configured to detect the occurrence of an event which entails variation in reception intervals of the counter in the measurement mode;

a deviation calculation unit configured to calculate a deviation amount between respective clocks of the control device and the servo controller, based on an occurrence period of the event and the command reception period, in the measurement mode; and a reception period adjustment unit configured to adjust the command reception period based on the deviation amount in an operation mode.

2. The servo controller according to claim 1, wherein adjustment time of the command reception period by the reception period adjustment unit is an integer multiple of a minimum clock value of the servo controller.

3. The servo controller according to claim 1, wherein the phase of the command reception period after the adjustment thereof by the reception period adjustment unit is shifted by a substantially half-period length from that before the adjustment.

4. The servo controller according to claim 1 further comprising a deviation buffer unit configured to store the deviation amount.

* * * * *